June 27, 1933.　　　　　　　C. TAMA　　　　　　　1,915,700
INDUCTION FURNACE FOR THE HEATING OF METALS HAVING A HIGH MELTING POINT
Filed April 24, 1931
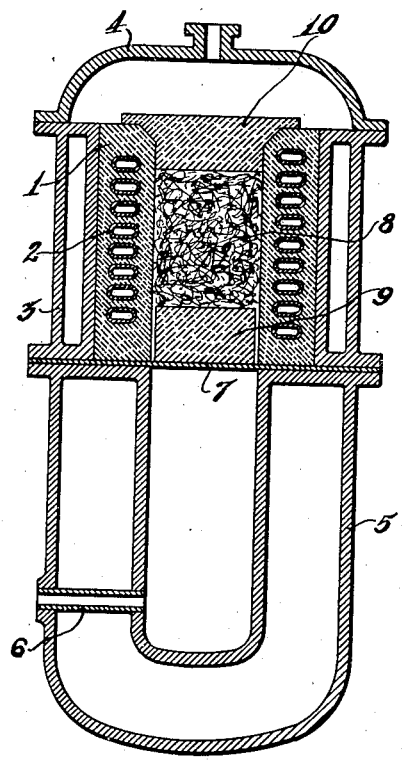
Witnesses
Geo. C. Jepson
Elmer W. Hacker
Inventor
Cyrano Tama
by
Attorney Patented June 27, 1933

1,915,700

UNITED STATES PATENT OFFICE

CYRANO TAMA, OF BERLIN-SCHONEBERG, GERMANY, ASSIGNOR TO AJAX ELECTROTHERMIC CORPORATION, OF TRENTON, NEW JERSEY

INDUCTION FURNACE FOR THE HEATING OF METALS HAVING A HIGH MELTING POINT

Application filed April 24, 1931, Serial No. 532,619, and in Germany August 14, 1929.

For the generation of the high temperatures required for sintering and melting such metals as tungsten, molybdenum, tantalum and the like, induction heating has proved very desirable as in this way temperatures of more than 3000° C. can be attained without any risk that, as is the case, for instance, with heating by arcs, foreign substances can come in contact with the respective metal and form undesired compounds therewith. The induction heating presents, besides, the further advantage that it renders possible a completely uniform heating of the charge and does not give rise to any rushes of current in the net.

With the known high-frequency induction furnaces, however, the induction coil of which surrounds the charge, it is very difficult to heat insulate the coil sufficiently from the high temperature existing in the furnace, as the coil, in order to secure high furnace efficiency, must be located as near to the charge as possible. The usual insulating materials, as for instance asbestos, quartz, glass, mica, and the like, are not resistant enough at the temperatures concerned, and also the usual insulations, such as magnesite, quartzite, and the like, are not able to withstand those high temperatures.

The present invention relates to an arrangement and combination of parts permitting the attainment of temperatures of over 3000° C. in the induction furnace without any detrimental action upon the insulations and the coil. I attain the object in view by manufacturing the insulations of the oxides of the metals chiefly of the carbon group which have a high melting point. Those oxides, such as thorium oxide, zirconium oxide, hafnium oxide, tantalum oxide and the like, have an extremely high melting point, as well as a very low conductivity for heat and also a very low electrical conductivity, so that it is possible to embed the coil directly into the insulating material without any separate insulation. This permits on the one hand, placing of the coil very close to the charge, and on the other hand, allows good cooling of the insulations, since the heat transmitted to them is removed by the cooling pipe provided for the coil, in intimate contact with the insulations. If necessary, the insulations can be cooled besides, by a separate cooling jacket. A particularly desirable substance is thorium oxide because of its very low electrical conductivity.

Another difficulty in the heating of substances having a high melting point resides in the fact that these substances, after having sintered, must cool down within the furnace, because if they come in contact with the air, i. e. with the oxygen of the same, they will instantaneously be oxidized. Now, in order to reduce as much as possible the cooling period during which the furnace must be stopped, the cooling is effected, according to this invention by gases free from injurious effect upon the charge which, after the current has been switched off, are introduced into the furnace and flow along the sintered block, whereby this latter is quickly cooled to such a degree that it can soon be removed from the furnace. In order to accelerate the working procedure still more, it is desirable to provide below the furnace a separate cooling vessel, consisting, for instance, of a chromium alloy having a very high melting point, the sintered block being inserted into said vessel in order to be cooled therein by a current of such a gas. While the block is being cooled down, the furnace can be charged with a fresh amount of material to be treated, so that the next heating follows immediately upon the removal of the cooled block from the said cooling vessel.

The invention is illustrated diagrammatically and by way of example on the accompanying drawing, on which is shown a vertical section through an induction furnace designed according to this invention.

The insulating material consists of thorium oxide, zirconium oxide or the like, and the induction coil 2 is embedded into the insulations and is cooled by water. The insulations are surrounded with a cooling jacket 3 through which water is conducted and are closed with an air-tight hood 4 which renders it possible to operate, if desired, also in vacuo. To the lower end of the furnace is attached the cooling vessel 5 which is connected with the furnace in an air-tight manner. Also this vessel is provided with a large water-jacket. Between the vessel 5 and the furnace is a thin layer 7 of asbestos which is provided with apertures for the passage of the gas.

The pulverulent substance 8 to be sintered is introduced into the charging space which is closed at its lower end by a block 9 consisting of thorium oxide, and after the substance 8 has been introduced into the furnace it is covered with a block 10 also consisting of thorium oxide. While the sintering operation proceeds a narrow space develops between the sintered block and the insulations whereby it is rendered possible to cause a cooling gas to flow from the block 9 along the mass 8 to the block 10, the two blocks being provided with apertures for this purpose.

If the furnace is to be used instantly again, the hood 4 is removed while the cooling gas passes along through the three superimposed blocks 8, 9 and 10, and these blocks are then lowered into the cooling vessel 5, the thin asbestos plate 7 being correspondingly pierced for that purpose. The block 8 is quickly cooled in the vessel 5 in the gas, and while this takes place the furnace can be charged again, so that the sintering of the next block can be carried out instantly after the previously cooled block has been removed from the vessel 5.

I claim:—

1. In an induction furnace for heating metals having a high melting point, a hollow water cooled furnace inductor, insulation enclosing the inductor and providing a space for a furnace chamber within the inductor and walls forming a water cooled casing about the inductor whereby the insulation is water cooled about its circumference and the coil is locally water cooled by water within the individual conductors of the coil.

2. In an induction furnace for heating metals having a high melting point, a furnace body providing a heating chamber, walls forming a cooling chamber beneath the heating chamber, a furnace inductor for heating a charge within the furnace, a separating wall between the heating chamber and the cooling chamber permeable to gas, upper and lower closures for the heating chamber also permeable to gas and means for introducing a cooling gas through the cooling chamber to pass up through the heating chamber.

3. In an induction furnace for heating metals having a high melting point, a furnace body providing a heating chamber, walls forming a cooling chamber beneath the heating chamber, a furnace inductor for heating a charge within the furnace, a separating wall between the heating chamber and the cooling chamber permeable to gas, upper and lower closures for the heating chamber also permeable to gas, cooling means supplying the cooling chamber, whereby the closure for the bottom of the heating furnace can be dropped with the charge into the cooling chamber and there cooled or the cooling medium of the cooling chamber can be passed up through the furnace charge.

4. In an induction furnace, a hollow water cooled inductor coil, insulation surrounding the coil to form a furnace chamber, top and bottom walls for the chamber, a destructible support for the bottom wall of the chamber, walls forming a cooling chamber below the support and adapted to be filled with cooling gas and walls forming a water cooling casing about the cooling chamber.

5. In an inductor furnace, an inductor coil hollow and adapted to be water cooled, insulation about the inductor coil forming a heating chamber, top and bottom removable closures for the chamber, a destructible support for the bottom closure, walls forming a water cooled and gas cooled cooling chamber below the support and walls forming a water cooling chamber about the inductor coil.

In testimony whereof I have affixed my signature.

CYRANO TAMA.